(12) United States Patent
Hilkes

(10) Patent No.: US 9,372,348 B2
(45) Date of Patent: *Jun. 21, 2016

(54) APPARATUS AND METHOD FOR A BIOPTIC REAL TIME VIDEO SYSTEM

(71) Applicant: eSight Corp., Kanata (CA)

(72) Inventor: Robert G. Hilkes, Ottawa (CA)

(73) Assignee: eSight Corp., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,241

(22) Filed: Dec. 5, 2014

(65) Prior Publication Data

US 2015/0084841 A1    Mar. 26, 2015

Related U.S. Application Data

(63) Continuation of application No. 13/309,717, filed on Dec. 2, 2011, now Pat. No. 8,976,086.

(60) Provisional application No. 61/419,539, filed on Dec. 3, 2010.

(51) Int. Cl.
*G02B 27/01* (2006.01)
*G09G 5/00* (2006.01)

(52) U.S. Cl.
CPC .......... *G02B 27/0176* (2013.01); *G02B 27/017* (2013.01); *G02B 27/0149* (2013.01); *G09G 5/00* (2013.01); *G02B 2027/0127* (2013.01); *G02B 2027/0138* (2013.01); *G02B 2027/0154* (2013.01); *G02B 2027/0156* (2013.01); *G02B 2027/0187* (2013.01)

(58) Field of Classification Search
CPC ............. G02B 27/017; G02B 27/0172; G02B 27/0174
See application file for complete search history.

(56) References Cited

U.S. PATENT DOCUMENTS

| | | | |
|---|---|---|---|
| 6,061,064 A | 5/2000 | Reichlen | |
| 6,255,650 B1 | 7/2001 | Warner et al. | |
| 8,976,086 B2 * | 3/2015 | Hilkes | 345/8 |
| 2005/0237271 A1 | 10/2005 | Yamamoto | |

* cited by examiner

*Primary Examiner* — Kent Chang
*Assistant Examiner* — Chayce Bibbee
(74) *Attorney, Agent, or Firm* — Greer, Burns & Crain, Ltd.

(57) ABSTRACT

A method and apparatus of displaying an electronic video image using a head-worn near-to-eye display in a non-immersive fashion, such that the wearer can choose, through simple adjustments of their neck and eye angles, to either look at the displayed video image or their natural environment. The invention also relates to the incorporation of prescription lenses into the optical chain of the near-to-eye display. The invention also relates to the use of motion and position sensors incorporated into the head-worn device to enable automatic stabilization of the video image. The invention also relates to the use of motion and position sensors incorporated into the head-worn device to automatically adjust the vertical angle of either the camera or the electronic display or both, by sensing the vertical angular position of the user's head.

20 Claims, 6 Drawing Sheets

APPARATUS AND METHOD FOR A BIOPTIC REAL TIME VIDEO SYSTEM

CROSS-REFERENCE TO RELATED APPLICATIONS

This application is a continuation of and claims priority to U.S. patent application Ser. No. 13/309,717 filed Dec. 2, 2011, which claims priority to and the benefit of U.S. Provisional Patent Application Ser. No. 61/419,539 filed Dec. 3, 2010, the entire contents of which are incorporated herein by reference.

FIELD OF THE INVENTION

The invention relates generally to the field of wearable electronic displays and more specifically to the field of vision care.

BACKGROUND

There are numerous applications for lightweight headworn near-to-eye displays. These are commonly called Head Mounted Displays (HMD). HMDs display to the eye an electronically rendered image such that the wearer perceives that they are watching a sizeable electronic display at some distance in front of them. The applications that use such HMDs are numerous, including but not limited to virtual reality, electronic gaming, simulation environments such as for military simulations or flight simulators, medical applications such as for the enhancement of sight, and consumer applications such as the ability to view videos in a mobile setting.

One of the fundamental challenges of HMDs is the tradeoff between the display's Field of View (FOV), being the size of the virtual display as perceived by the wearer, and pixel size. FOV is normally defined as the number of angular degrees subtended within the viewer's overall field of vision, horizontally, vertically, or on the diagonal. Horizontal FOV dimensions in the range of 20-30 degrees are typical, with larger dimensions being possible at significant expense. Pixel size is similarly expressed as the number of angular arc minutes (1/60th of a degree) subtended by a single, typically square pixel element. As one might expect, to achieve a larger FOV with a given pixel resolution (number of pixels), results in a larger pixel size, and consequent loss of image detail.

Peripheral vision is that portion of the human field of vision outside the center, say, 10-15 degrees FOV. Peripheral vision is extremely important in some HMD applications, especially those in which the wearer must maintain a connection with their natural environment to contextualize their situation, and enable way finding, orientation, and mobility. To provide significant peripheral vision via the electronic display requires an extremely large (and expensive) HMD. Alternately HMDs which provide a significant natural peripheral vision external to the HMD housing, provide a very limited virtual electronic FOV.

Many HMD applications can benefit from the incorporation of a live camera into the HMD, such that the wearer can not only view electronic data from a source, such as a video file, but also live video images of the world in front of them. Image processing can be used to enhance the live camera image before it is presented to the eye, providing magnification, enhancement of brightness, or improved contrast for example.

In HMD systems that are to be used for multiple activities, different camera angles may be required for different tasks. For example, to observe an object a distance, the camera angle should be nearly horizontal relative to the horizon when the wearer's neck is straight and their gaze angled at the horizon. On the other hand, to view hand-held objects at a close distance requires a camera that is angled downward, in order to avoid a highly exaggerated downward neck posture. In this manner, the angle of the camera mimics the angular movement of one's eyes in a non-HMD world.

Finally, the angle of the display relative to the eyes is also dependent on the specific tasks of the wearer. In certain situations the wearer would like to look into the electronic display only temporarily, and by looking up at an angle higher than their habitual gaze. In other situations, the wearer would prefer a more immersive usage model, where the electronic display is directly in front of their normal line of gaze.

What is needed then is a general HMD device that is capable of providing significant unobstructed peripheral vision outside of the electronic display FOV, while simultaneously providing a high resolution video image. Further, the ability to adjust the angle of the display and the camera according to the wearer's specific activity would provide significant comfort and increased usability.

Other aspects and features of the present invention will become apparent to those ordinarily skilled in the art upon review of the following description of specific embodiments of the invention in conjunction with the accompanying figures.

SUMMARY

The ability to quickly alternate as required by the specific task, between viewing an image presented in the electronic display and viewing the world without the electronic display, enables many possible usage models for an HMD. Furthermore, in an HMD with an integrated camera, the ability to adjust the vertical camera angle for different tasks, viewing objects distant and close for example, significantly increases the usability of such a device. Finally, an HMD whereby the user is able to select the vertical position of the electronic display, in order to tradeoff a comfortable immersive video experience versus maintaining a broad natural field of view enables the HMD to be used in a variety of user applications and postures.

The invention, in one aspect, relates to a method of orienting an electronic near-to-eye display such that the wearer views it slightly above their habitual line of sight for a given task. In this manner the wearer, through slight neck and eye angle adjustments can, with minimal effort, alternate between the electronic display and their natural vision.

In one embodiment, the electronic display is mounted slightly above the wearer's habitual line of sight, so that by angling the neck slightly forward and directing their gaze slightly upward, they can look into the display. Alternately by angling the neck slightly back and directing their gaze slightly down, they can view below the electronic display using their natural vision.

In another embodiment, the apparatus incorporates the wearer's prescription ophthalmic lenses, so that whether they gaze up into the electronic HMD or down using their natural vision, they are able to do so through their prescription lenses. This embodiment of the invention alleviates the need to switch between the HMD device and the wearer's habitual spectacles.

In another embodiment the apparatus incorporates a video camera, which provides the video information to the electronic display, the angle of the camera being adjustable as required by the specific task.

In any of the above embodiments the source of the video may come from a device other than the camera, in any standard electronic video format such as MPEG for example.

In another embodiment the apparatus may deploy motion sensing components in order to facilitate image stabilization for the electronic video image that is captured by the camera.

In another embodiment the motion sensing components could be used to determine the angular orientation of the apparatus, so that the vertical camera angle can be automatically adjusted based on head position.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

DETAILED DESCRIPTION

Figure 1:
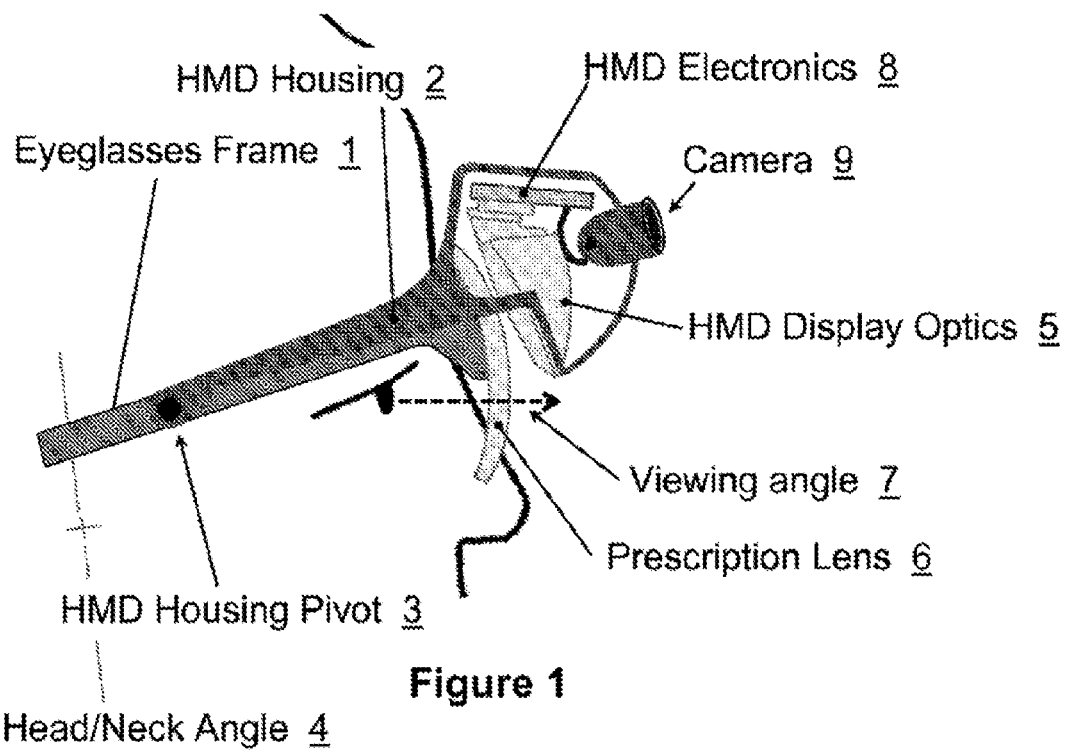
FIGS. 1 through 4 are highly schematic diagrams of an embodiment of the system of the invention.
Figure 6:
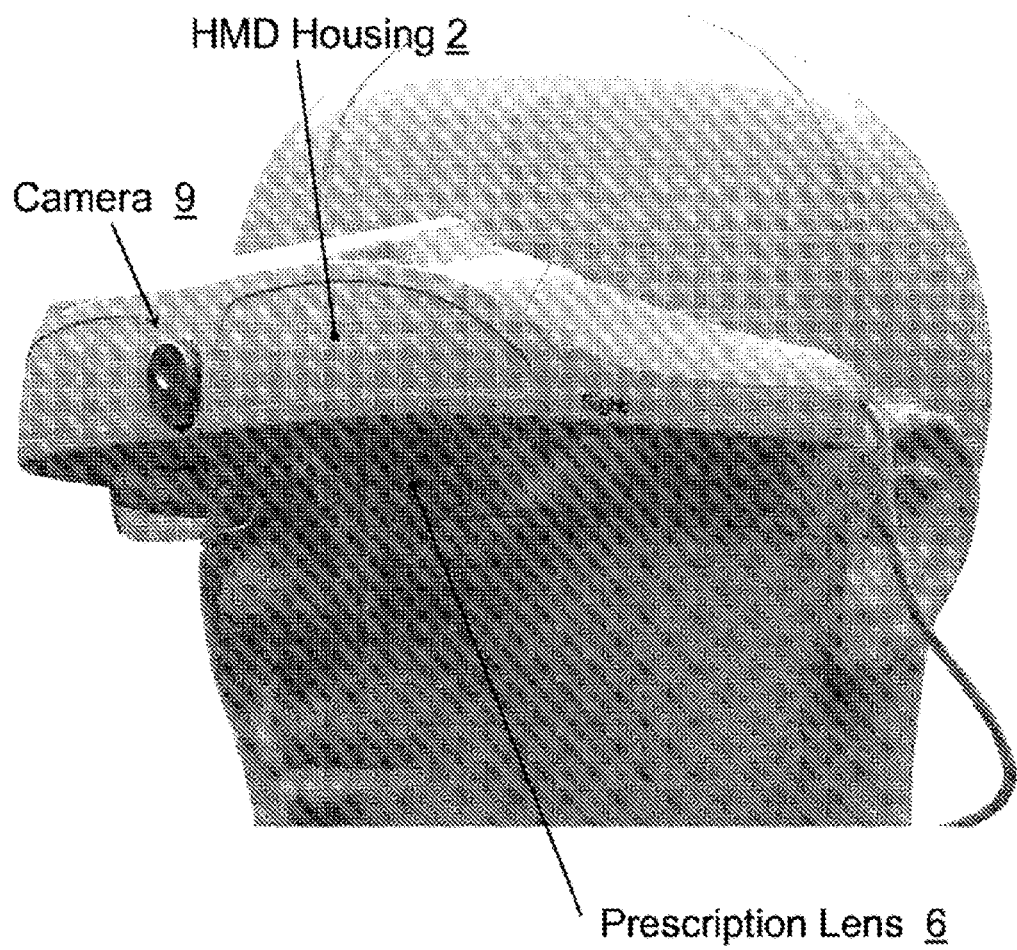
FIG. 6 is a more realistic rendering of a particular embodiment of the system of the invention.

In brief overview and referring to FIG. 1 and FIG. 6, the system in one embodiment includes prescription lenses 6 mounted to an eyeglasses frame 1. The Head Mounted Display portion of the system comprises a housing 2, which can move relative to the eyeglasses frame 1, about a pivot point 3. The HMD housing 2 incorporates HMD optics 5, a camera 9, and HMD electronics 8 (collectively, the "HMD").

In the orientation depicted in FIG. 1, the wearer's head/neck posture is angled slightly back 4, and he is viewing the world 7 through the prescription lens 6, without the use of the HMD optics 5 or camera 9.

Figure 2:
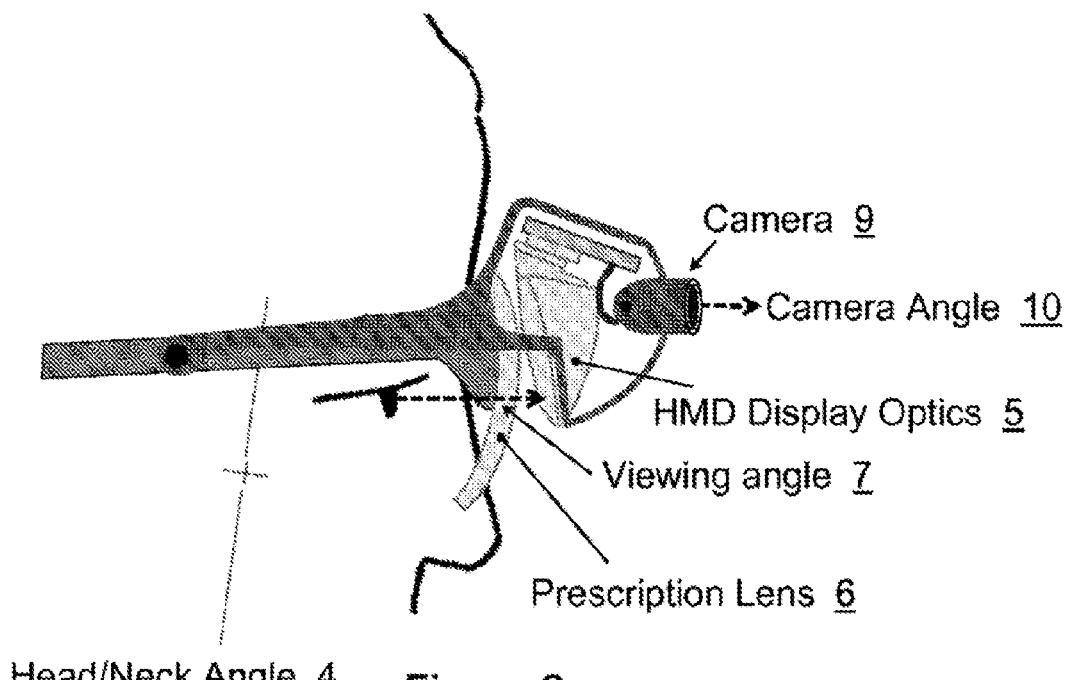

In FIG. 2, the head/neck angle 4 is slightly forward, allowing the user to view the HMD optics 5 through the same prescription lens 6 by directing their gaze at a slight upward angle 7. In this mode, video information viewed through the HMD optics 5 can be provided from the video camera 9, oriented at an outward angle 10 such that objects at a distance can be viewed in the video image. As discussed, the video could also come from other sources.

Figure 3:
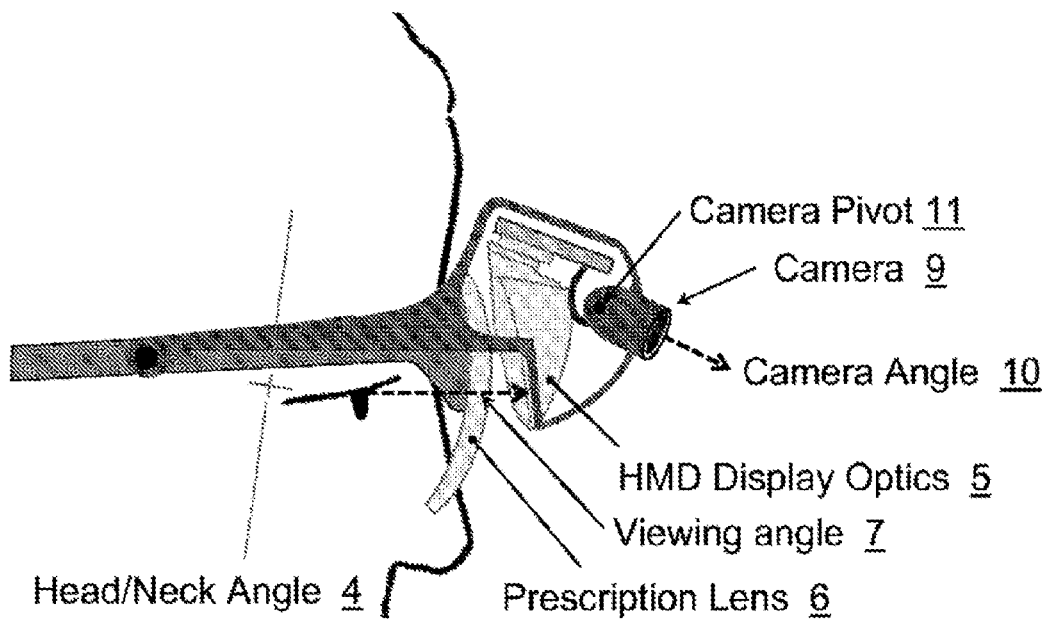

In FIG. 3 the head/neck angle 4 is unchanged from FIG. 2, but the camera has been angled downward on a pivot point 11 so that the camera angle 10 is now aimed at a nearby object close at hand, perhaps in the wearer's hands.

Figure 4:
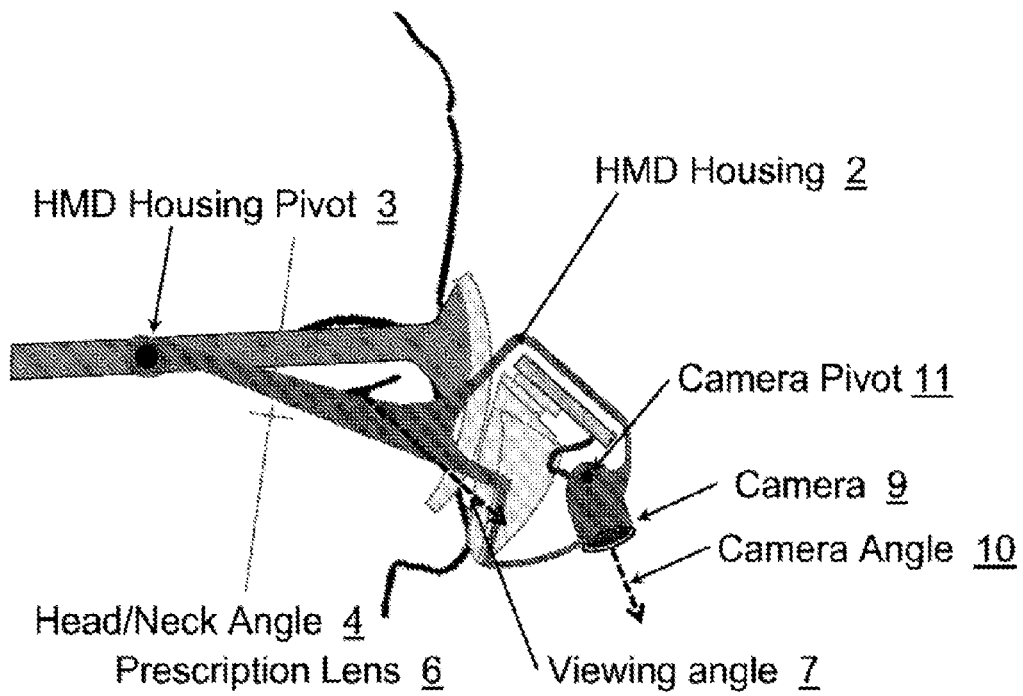

In FIG. 4 the slightly forward head/neck angle 4 remains unchanged, but the HMD angle has been significantly lowered by pivoting the HMD housing 2 relative to the eyeglasses frame 1, around a pivot point 3. In this orientation the wearer is able to adopt a more comfortable viewing angle 7 for near-in tasks. Furthermore, the camera angle 10 can be directed further downward because the camera pivot point 11 moves with the HMD housing 2.

Figure 5:
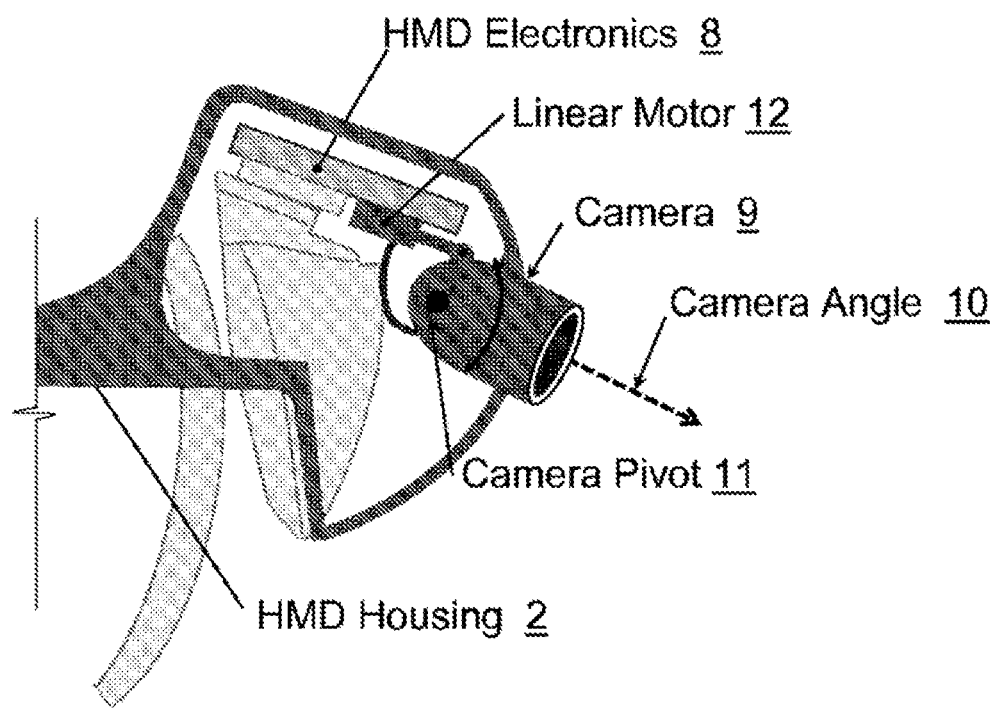
FIG. 5 is a more detailed view of an embodiment of the system for automatically adjusting the angle of the camera.

In FIG. 5, a method is shown whereby a linear motor 12 can be used to adjust the vertical angle 10 of the camera 9. The camera rotated around a pivot point 11 that is affixed to the HMD housing 2. With the adjustment of the camera angle automated thus, it is possible to use motion and position sensors embodied in the HMD electronics 8, to provide positional data that can be used to control the linear motor 12.

Alternately, the angle 10 of the camera 9 can be adjusted manually by the user.

Figure 7:
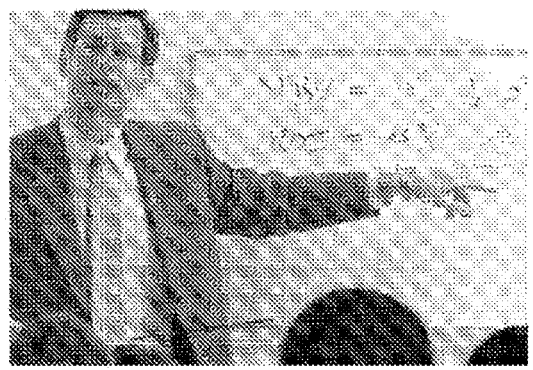
FIGS. 7A through 7C depict three successive frames of simulated video, in order to show how motion vectors can be used for image stabilization.
Figure 7:
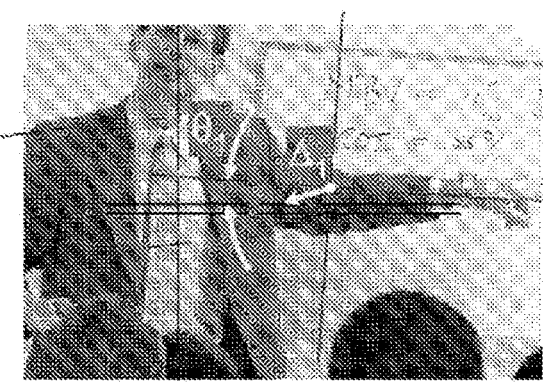
Figure 7:
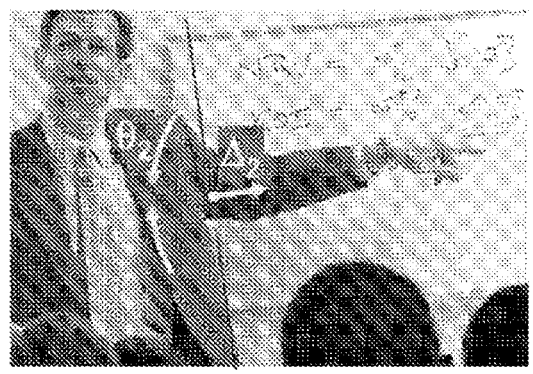

FIG. 7 shows how the same motion and position sensors embodied in the HMD electronics 8 can be used to enable an image stabilization function. FIGS. 7A, 7B, and 7C show three consecutive frames of video as captured by the camera 9. Because of the normal movement of the wearer's head, successive frames of video have a translational (up/down, left/right) and rotational (angular) position relative to the previous frame. The frame depicted in FIG. 7B for example has shifted to the right/down and rotated slightly counter-clockwise relative to the previous frame 7A. The translational vector $\Delta 1$ and rotational angle $\theta 1$ can be determined from the motion and position sensors embodied in the HMD electronics 8. By applying the opposite of the translational vector and the reverse rotational angle to the pixels in the video frame 7B, the differences between the two frames 7A and 7B can be removed. FIG. 7C carries the example further, showing a frame of video that is now shifted left/down and clockwise relative to the previous frame 7B. A new vector $\Delta 2$ and rotational angle $\theta 2$ can be applied, and so forth so that over time, small frame-to-frame variations caused by the wearer's head movement are removed from the displayed video. To distinguish between minor head movements, for which image stabilization should be applied, and gross head movements, which indicate the wearer's scene of interest has changed, requires that the image stabilization function only be applied to small translational and rotational vectors.

Figure 8A:
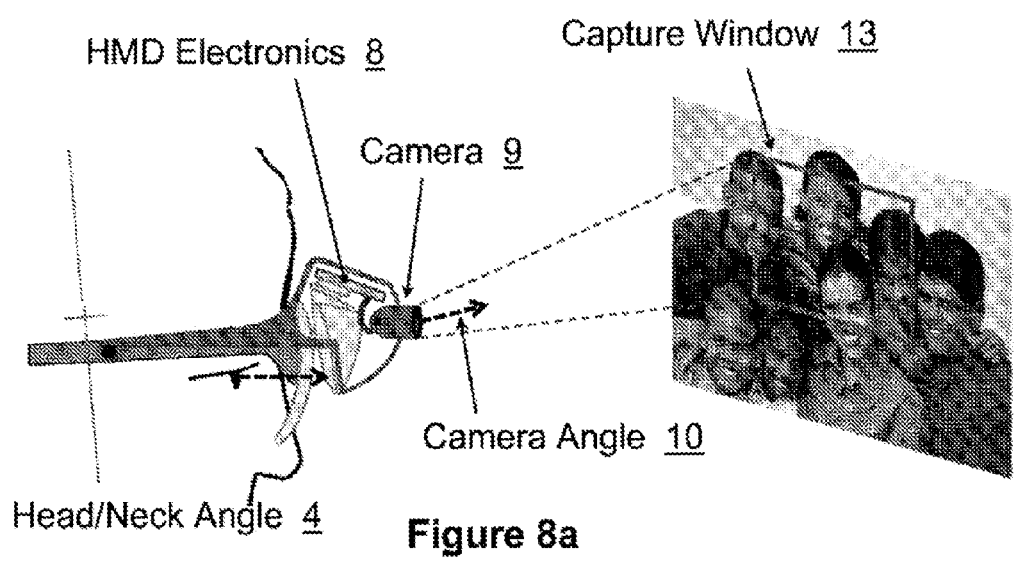
FIGS. 8A and 8B show an alternate method of altering the camera angle through defining a window on the image sensor rather than by physically altering the camera angle.
Figure 8B:
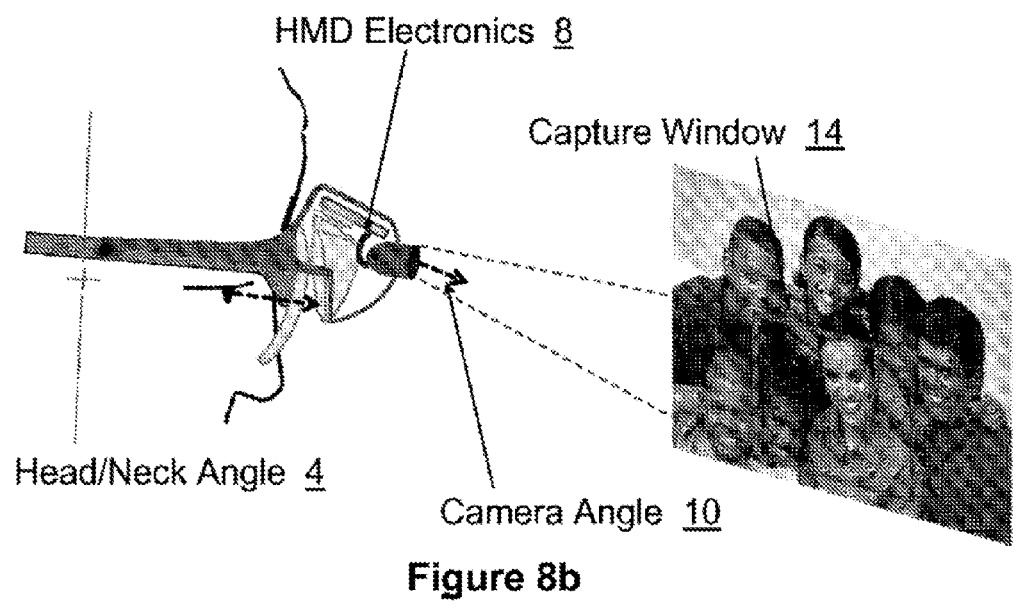

In FIGS. 8A and 8B, the angle of the camera 9 is adjusted not by physically rotating the camera as previously discussed. Rather, an area of pixels, or a window 13, 14 can be defined on the image sensor so that the wearer perceives that the camera angle is physically altered. This technique requires a camera system wherein the usable image sensor area is larger than the video that is to be displayed to the wearer. Motion and position sensors embodied in the HMD electronics 8 can be used to determine the wearer's head/neck angle 4 and, based on this information, define a capture window 13, 14 that gives the wearer the perception of a high or low camera angle 10.

While the present invention has been described in terms of certain exemplary preferred embodiments, it will be readily understood and appreciated by one of ordinary skill in the art that it is not so limited, and that many additions, deletions and modifications to the preferred embodiments may be made within the scope of the invention as hereinafter claimed. Accordingly, the scope of the invention is limited only by the scope of the appended claims.

What is claimed is:

1. A head-worn device comprising:
   a frame;
   a binocular electronic near-to-eye display assembly pivotally attached to the frame; and
   a camera with vertical angle adjustment forming part of the electronic near-to-eye display;
   whereby the wearer views their environment directly with their head in a first position such that the electronic near-to-eye display is pivoted upwards; views a video image presented on the electronic near-to-eye display with their head in a second position such that the electronic near-to-eye display is pivoted down in front of their eyes; and views the video image generated from the camera and presented on the electronic near-to-eye display with their head in a third position, wherein the third position is such that the electronic near-to-eye display is pivoted further down in front of them than when their head was in the second position.

2. The head-worn device according to claim 1, wherein the vertical angle of the camera changes between a first angle and a second angle when the wearer's head is in the second and third positions respectively.

3. The head-worn device according to claim 1, wherein the electronic near-to-eye display automatically pivots into the different positions based upon the user's head being in the first, second, and third positions.

4. The head-worn device according to claim 1, wherein the electronic near-to-eye display is manually pivoted into the different positions when the user's head is in the first, second, and third positions; and
the vertical angle of the camera automatically changes between a first angle and a second angle when the wearer's head is in the second and third positions respectively.

5. The head-worn device according to claim 1, wherein the electronic near-to-eye display is manually pivoted into the different positions when the user's head is in the first, second, and third positions; and
the vertical angle of the camera is manually adjustable between a first angle and a second angle when the wearer's head is in the second and third positions respectively.

6. The head-worn device according to claim 1, wherein the vertical angle of the camera adjusts according to whether the user's head is in the first position or the second position.

7. The head-worn device according to claim 1, further comprising:
an orientation sensor; and
a motion sensor,
wherein the video image from at least one of the camera and display electronics is stabilized using motion information provided by the orientation and motion sensors.

8. The head-worn device according to claim 7, wherein the vertical angle of the camera is automatically adjusted for a given task using information provided by the orientation and motion sensors.

9. The head-worn device according to claim 7, wherein the perceived vertical angle of the camera is determined not by adjusting the physical angle of the camera but by defining an area of pixels of the camera sensor presented to the user upon the electronic near-to-eye display.

10. The head-worn device according to claim 7, wherein the electronic near-to-eye display displays either an image acquired by the camera or an image coupled to the electronic near-to-eye display from another image source.

11. A head mounted electronic near-to-eye display module, the electronic near-to-eye display module comprising:
a camera adjustably attached to the display module;
a display electronics circuit in communication with the camera;
a head mounted display optics having a first surface adjacent the display electronics circuit and a second surface disposed towards a user's head; and
a means for pivotally attaching the electronic near-to-eye display module to a frame worn by the user, whereby the wearer views their environment directly with their head in a first position such that the electronic near-to-eye display module is pivoted upwards; views a video image presented on the electronic near-to-eye display module with their head in a second position such that the electronic near-to-eye display module is pivoted down in front of their eyes; and views the video image generated from the camera and presented on the electronic near-to-eye display module with their head in a third position, wherein the third position is such that the electronic near-to-eye display module is pivoted further down in front of them than when their head was in the second position.

12. The head mounted electronic near-to-eye display module according to claim 11, wherein
the vertical angle of the camera changes between a first angle and a second angle when the wearer's head is in the second and third positions respectively.

13. The head mounted electronic near-to-eye display module according to claim 11, wherein
the electronic near-to-eye display automatically pivots into the different positions based upon the user's head being in the first, second, and third positions.

14. The head mounted electronic near-to-eye display module according to claim 11, wherein
the electronic near-to-eye display is manually pivoted into the different positions when the user's head is in the first, second, and third positions; and
the vertical angle of the camera automatically changes between a first angle and a second angle when the wearer's head is in the second and third positions respectively.

15. The head mounted electronic near-to-eye display module according to claim 11, wherein
the electronic near-to-eye display is manually pivoted into the different positions when the user's head is in the first, second, and third positions; and
the vertical angle of the camera is manually adjustable between a first angle and a second angle when the wearer's head is in the second and third positions respectively.

16. The head mounted electronic near-to-eye display module according to claim 11, wherein
the vertical angle of the camera adjusts according to whether the user's head is in the first position or the second position.

17. The head mounted electronic near-to-eye display module according to claim 11, further comprising;
an orientation sensor; and
a motion sensor,
wherein the video image from at least one of the camera and display electronics is stabilized using motion information provided by the orientation and motion sensors.

18. The head mounted electronic near-to-eye display module according to claim 17, wherein
the vertical angle of the camera is automatically adjusted for a given task using information provided by the orientation and motion sensors.

19. The head mounted electronic near-to-eye display module according to claim 17, wherein
the perceived vertical angle of the camera is determined not by adjusting the physical angle of the camera but by defining an area of pixels of the camera sensor presented to the user upon the electronic near-to-eye display.

20. The head mounted electronic near-to-eye display module according to claim 17, wherein the electronic near-to-eye display displays either an image acquired by the camera or an image coupled to the electronic near-to-eye display from another image source.

* * * * *